United States Patent [19]

Kudo et al.

[11] Patent Number: 5,768,243
[45] Date of Patent: Jun. 16, 1998

[54] OPTICAL RECORDING MEDIUM AND ITS RECORDING APPARATUS AND REPRODUCING APPARATUS

[75] Inventors: Hideo Kudo; Yoshimi Tomita, both of Tsurugashima, Japan

[73] Assignee: Pioneer Electronic Corporation, Tokyo, Japan

[21] Appl. No.: 824,466

[22] Filed: Mar. 26, 1997

Related U.S. Application Data

[62] Division of Ser. No. 385,519, Feb. 8, 1995, Pat. No. 5,656,348.

[30] Foreign Application Priority Data

Feb. 17, 1994 [JP] Japan ......................... 6-20593

[51] Int. Cl.$^6$ ................................................. G11B 7/00
[52] U.S. Cl. ................................. 369/111; 369/49
[58] Field of Search ........................... 369/111, 49, 47, 369/48, 275.3, 275.4, 54

[56] References Cited

U.S. PATENT DOCUMENTS

| | | | |
|---|---|---|---|
| 4,420,828 | 12/1983 | Yoshida et al. | 369/111 |
| 4,534,021 | 8/1985 | Smith | 369/111 |
| 4,903,151 | 2/1990 | Mizukami et al. | 360/78.01 |
| 5,343,453 | 8/1994 | Ogino | 369/44.28 |
| 5,493,548 | 2/1996 | Kamioka | 369/48 |
| 5,506,825 | 4/1996 | Gushima et al. | 369/49 |
| 5,619,387 | 4/1997 | Ottesen et al. | 369/111 |
| 5,633,847 | 5/1997 | Masuda et al. | 369/48 |

*Primary Examiner*—Tan Dinh
*Attorney, Agent, or Firm*—Evenson, McKeown, Edwards & Lenahan, PLLC

[57] ABSTRACT

An optical recording medium which is constructed in a manner such that a plurality of recording areas in which an information signal is recorded along vortical spiral tracks are arranged in a ring shape on a recording surface and a vortex direction of the spiral track of the outside recording area among the plurality of recording areas differs from that of the spiral track of the inside recording area. When the information signal is recorded to the recording medium, the first writing device executes the writing operation from the outer rim side toward the inner rim side of the spiral track of the outside recording area and the second writing device executes the writing operation from the inner rim side toward the outer rim side of the spiral track of the outside recording area. When the recorded information signal is reproduced, the first reading device executes the reading operation from the outer rim side toward the inner rim side of the spiral track of the outside recording area and the second reading device executes the reading operation from the inner rim side toward the outer rim side of the spiral track of the outside recording area.

7 Claims, 12 Drawing Sheets

FIG. 1

PRIOR ART

FIG.2

PRIOR ART

| STEP | INSIDE LIGHT BEAM | OUTSIDE LIGHT BEAM |
|---|---|---|
| 1 | ZONE 1 | ZONE 22 |
| 2 | ZONE 2 | ZONE 21 |
| : | : | : |
| 11 | ZONE 11 | ZONE 12 |

OPTICAL RECORDING MEDIUM AND ITS RECORDING APPARATUS AND REPRODUCING APPARATUS

This is a divisional of application Ser. No. 08/385,519, filed Feb. 8, 1995 and now is U.S. Pat. No. 5,656,348.

BACKGROUND OF THE INVENTION

1. Field of the Invention

The invention relates to an optical recording medium and its recording apparatus and reproducing apparatus. More particularly, the invention relates to an optical recording medium which can record and reproduce information at a high density and a high transfer rate and also relates to its recording apparatus and reproducing apparatus.

2. Description of the Related Background Art

Figure 1:
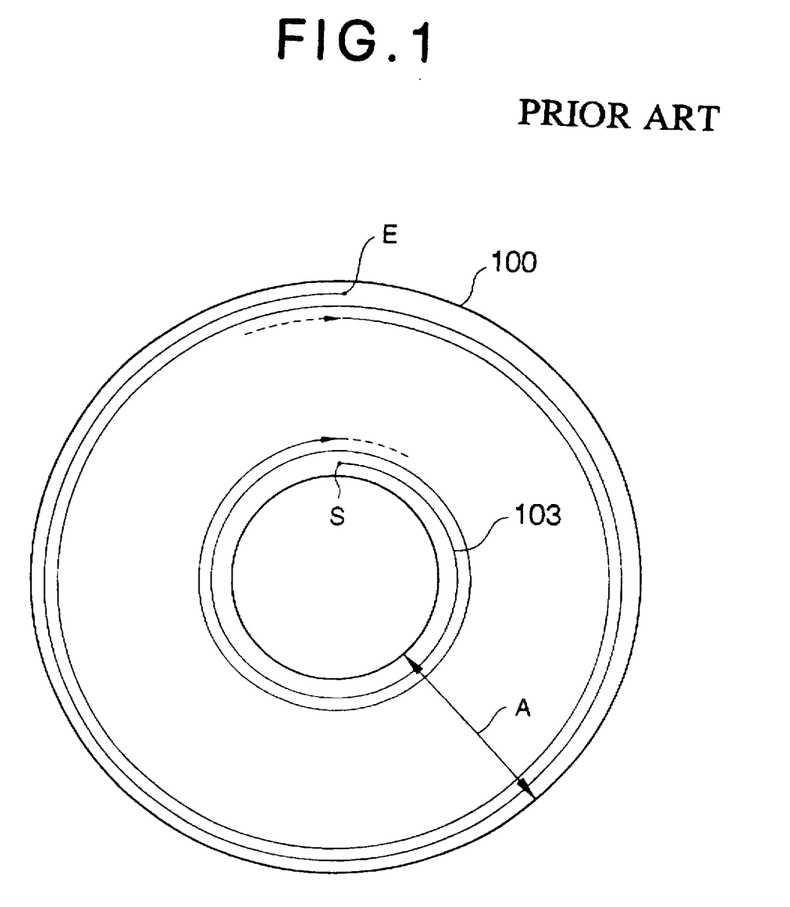
FIGS. 1 and 2 are diagrams showing recording methods of conventional optical discs.
Figure 2:
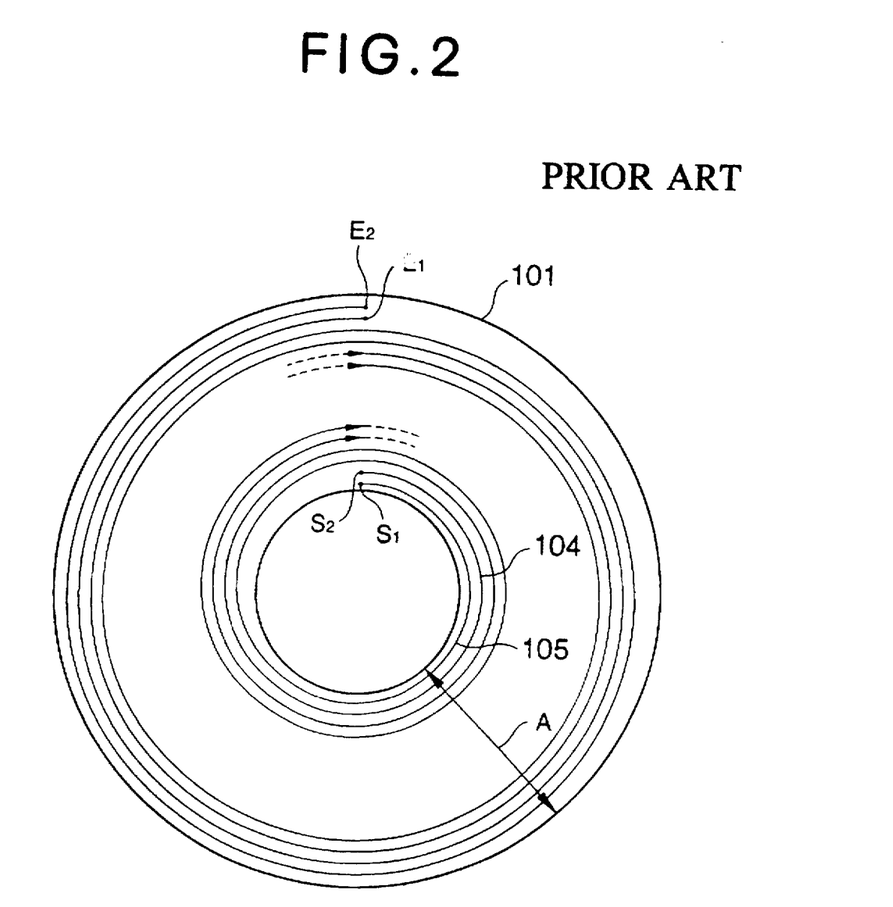

FIGS. 1 and 2 show optical recording media according to conventional recording systems.

FIG. 1 shows an optical disc of the spiral recording system. In a recording area A of an optical disc 100, an information signal is recorded along a spiral track 103 from a signal track start point S to a signal track end point E.

FIG. 2 shows an optical disc of the double spiral recording system. In the recording area A of an optical disc 101, information signals are recorded along spiral tracks 104 and 105 from a first signal track start point $S_1$ and a second signal track start point $S_2$ to a first signal track end point $E_1$ and a second signal track end point $E_2$, respectively. Two light beams are simultaneously used when the information signals are recorded to the optical disc of the double spiral recording system or the information signals are reproduced from the optical disc.

In the optical disc of the spiral recording system shown in FIG. 1 and the optical disc of the double spiral recording system shown in FIG. 2, a CAV (Constant Angular Velocity) recording system is adopted. As a light spot approaches the outside in the radial direction of the disc, therefore, a unit recording mark length increases, so that even in case of the information of the same length, the recording mark length needs to be increased on the outer rim side and a recording density cannot be improved.

Figure 3:
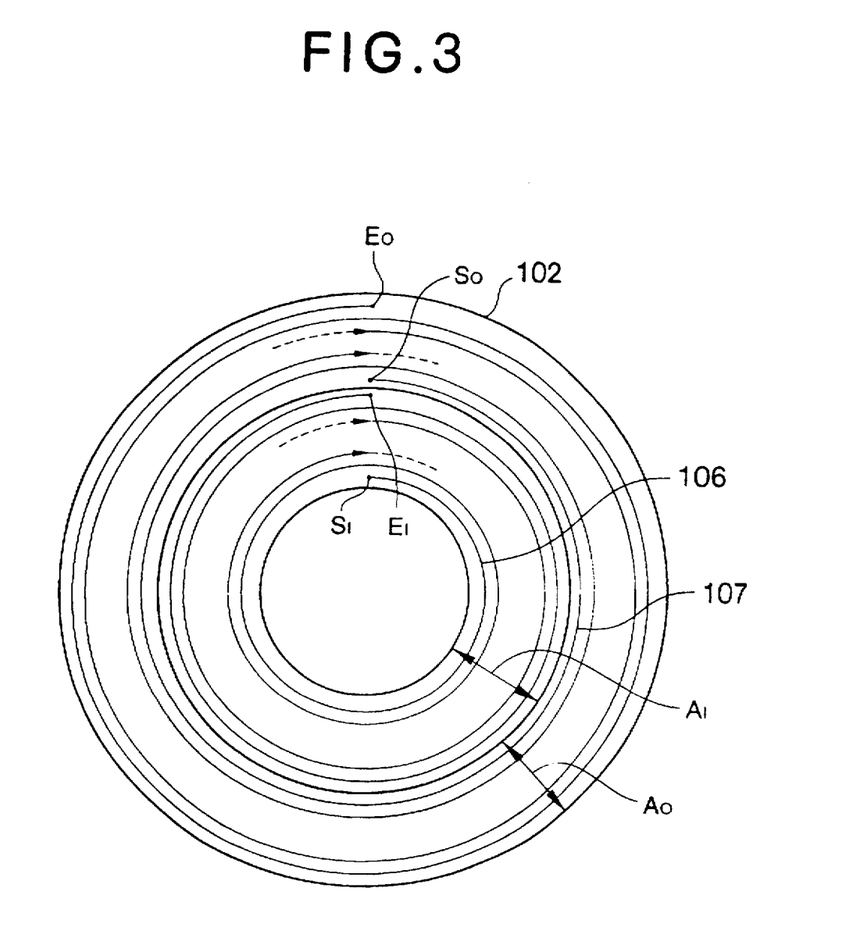
FIG. 3 is a diagram showing a recording method of an optical disc proposed instead of the prior art.

An optical disc 102 using a 2-zone spiral recording system as shown in FIG. 3, therefore, has been proposed in order to improve the recording density. Each track of an inside recording area $A_I$, and an outside recording area $A_O$ is concentrically arranged on the optical disc 102. An information signal is recorded in the inside recording area $A_I$ along a spiral track 106 from an inside signal track start point $S_I$ to an inside signal track end point $E_I$. Similarly, an information signal is recorded in the outside recording area $A_O$ along a spiral track 107 from an outside signal track start point $S_O$ to an outside signal track end point $E_O$. Even in the optical disc using the 2-zone spiral recording system, two light beams are simultaneously used when the information signals are recorded and reproduced.

In the optical disc shown in FIG. 3, although a data transfer rate of the inside recording area $A_I$, differs from a data transfer rate of the outside recording area $A_O$, the sum of the data transfer rates of both areas is always constant.

In the optical disc using the 2-zone spiral recording system, the recording density of the outside recording area $A_O$ can be raised to a value larger than that of the inside recording area $A_I$ (namely, the data transfer rate can be raised) and the recording density of the whole optical disc 102 can be increased.

In the image processes of a high definition television such as a high vision television, however, an amount of information to be processed per unit time is fairly large. There is, consequently, a problem such that the recording density is further raised than that of the optical disc shown in FIG. 3 and, at the same time, a high data transfer rate has to be realized.

SUMMARY OF THE INVENTION

It is, therefore, an object of the invention to provide an optical recording medium in which a high data transfer rate can be obtained and a recording density of an information signal is high.

Another object of the invention is to provide a recording apparatus which can obtain such a high data transfer rate and can record an information signal to an optical recording medium having a high recording density of the information signal.

Still another object of the invention is to provide a reproducing apparatus which can obtain such a high data transfer rate and can reproduce an information signal recorded on an optical recording medium having a high recording density of the information signal.

According to the invention, there is provided an optical recording medium in which a plurality of recording areas are arranged in a ring shape on a recording surface and an information signal is recorded in each recording area along spiral tracks, wherein a vortex direction of the spiral tracks in the outside recording area among the plurality of recording areas differs from that of the spiral track of the inside recording area.

According to the invention, there is provided a recording apparatus for recording an information signal onto an optical recording medium which is constructed in a manner such that a plurality of recording areas in which the information signal is recorded along spiral tracks are arranged in a ring shape on a recording surface and a vortex direction of the spiral track of the outside recording area among the plurality of recording areas differs from that of the spiral track of the inside recording area, wherein said recording apparatus comprises a first writing device which is movable arranged for the outside recording area and writes the information signal to the outside recording area and a second writing device which is movably arranged for the inside recording area and writes the information signal to the inside recording area, and in a recording mode, the first writing device executes the writing operation from the outer rim side toward the inner rim side of the spiral track of the outside recording area and the second writing device executes the writing operation from the inner rim side toward the outer rim side of the spiral track of the outside recording area.

According to the invention, there is provided a reproducing apparatus for reading and reproducing an information signal from an optical recording medium which is constructed in a manner such that a plurality of recording areas in which the information signal has been recorded along spiral tracks are arranged in a ring shape on a recording surface and a vortex direction of the outside recording area among the plurality of recording areas differs from that of the spiral track of the inside recording area, wherein the reproducing apparatus comprises a first reading device which is movably arranged for the outside recording area and reads the information signal from the outside recording area and a second reading device which is movably arranged for the inside recording area and reads out the information signal from the inside recording area, and in a reproducing mode, the first reading device executes the reading operation from the outer rim side toward the inner rim side of the spiral track of the outside recording area and the second reading device executes the reading operation from the inner rim side to the outer rim side of the spiral track of the outside recording area.

DETAILED DESCRIPTION OF THE PREFERRED EMBODIMENT

An embodiment of the present invention will now be described in detail hereinbelow with reference to the drawings.

Figure 4:
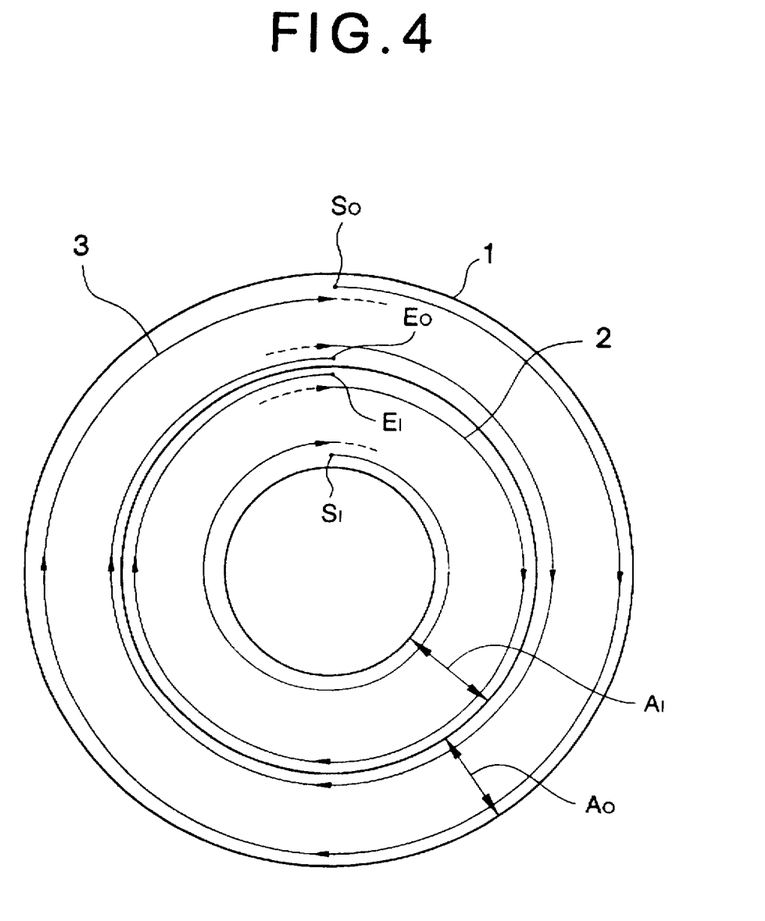
FIG. 4 is a diagram showing an optical disc according to an embodiment of the invention.

FIG. 4 shows a disc-shaped optical recording medium according to the present invention.

In FIG. 4, an optical disc 1 includes the ring-shaped inside recording area $A_I$ and the ring-shaped outside recording area $A_O$ on a recording surface. In the inside recording area $A_I$, the inside signal track start point $S_I$ is located on the inner rim side of the disc 1 and an information signal is recorded along a spiral track 2 from the inside signal track start point $S_I$ to the inside signal track end point $E_I$. In the outside recording area $A_O$, the outside signal track start point $S_O$ is located on the outer rim side of the disc 1 and an information signal is recorded along a spiral track 3 from the outside signal track start point $S_O$ to the outside signal track end point $E_O$. Namely, the vortex direction of the spiral track of the inside recording area $A_I$ differs from that of the outside recording area $A_O$. When the information signal is recorded and reproduced, an inside light beam in two light beams is used for the inside recording area $A_I$, and an outside light beam is used for the outside recording area $A_O$.

In the optical disc 1 of the invention, further, a plurality of concentric zones are set in each of the inside and outside recording areas $A_I$ and $A_O$. The number of zones of the inside recording area $A_I$ is equal to that of the outside recording area $A_O$.

Figure 5:
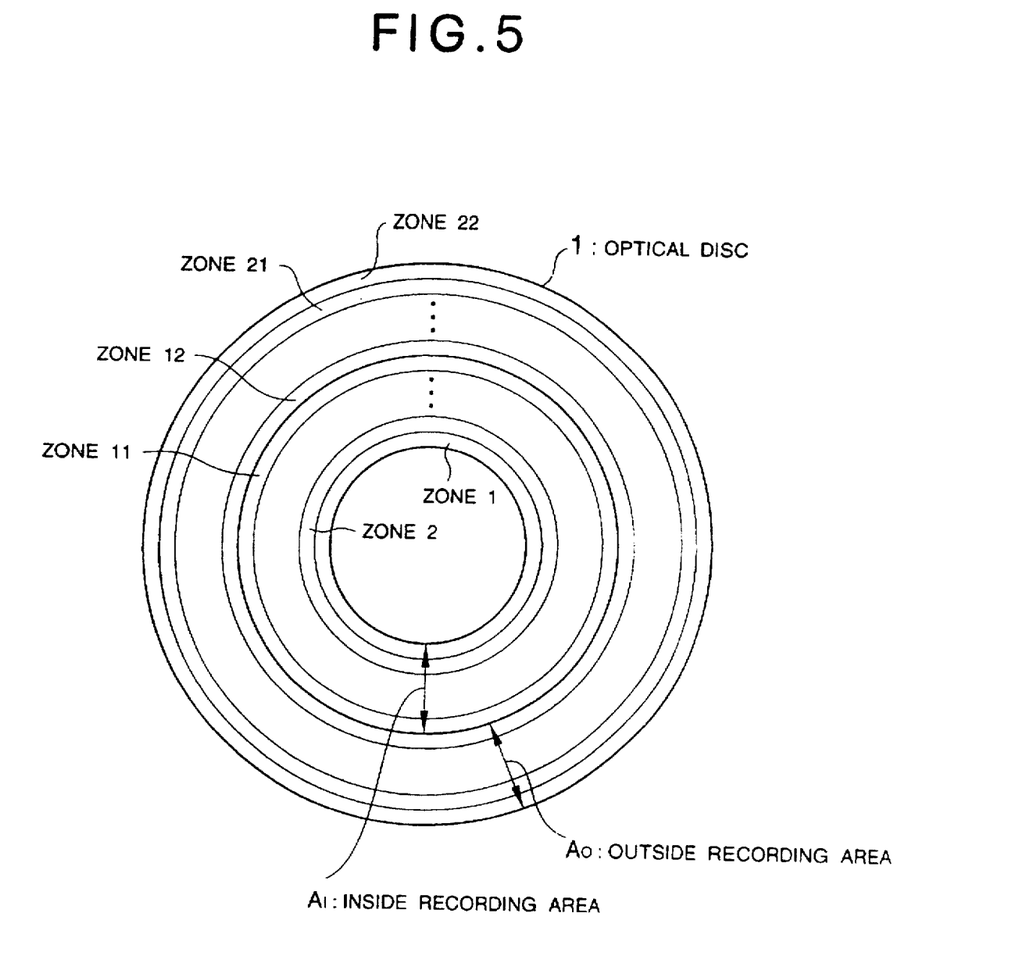
FIG. 5 is a diagram showing zones in the optical disc of FIG. 4.

FIG. 5 shows, for example, a case where twenty-two ring-shaped zones 1 to 22 are set to the optical disc In the optical disc 1 shown in FIG. 5, a recording density of the information signal increases as the zone position moves from the zone 1 to the zone 22. A region of the zones 1 to 11 corresponds to the inside recording area $A_I$ of the disc 1 shown in FIG. 4 and a region of the zones 12 to 22 corresponds to the outside recording area $A_O$, respectively. Namely, the information signal is recorded from the zone 1 toward the zone 11 in the inside recording area $A_I$. The information signal is recorded from the zone 22 to the zone 12 in the outside recording area $A_O$.

The spiral track 2 in FIG. 4 is continuous in the inside recording area $A_I$. The spiral track 3 is similarly continuous in the outside recording area $A_O$. The information signal is recorded in a manner such that the recording density differs every zone in each spiral track.

Figure 6:
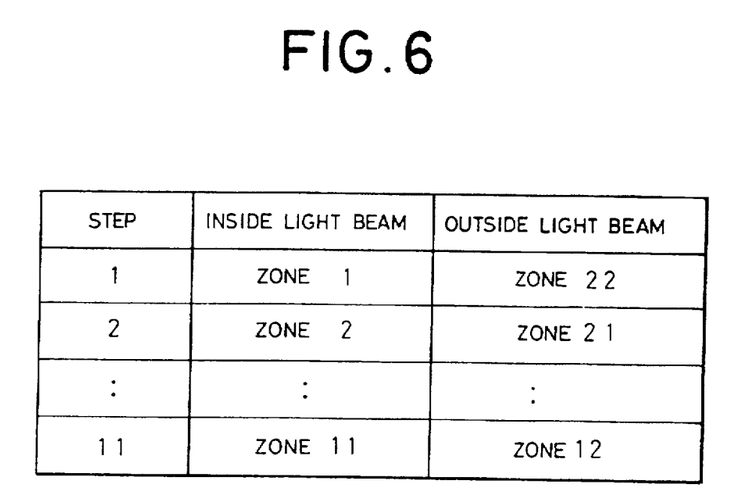
FIG. 6 is a table showing the orders of the zones in the recording and reproducing modes of an information signal.

In the optical disc 1 as shown in FIG. 5, the information signals are recorded and reproduced in accordance with the orders shown in FIG. 6.

In FIG. 6, the recording density of the information signal increases as the zone position moves from the zone 1 toward the zone 11 in case of the inside recording area $A_I$. The recording density decreases as the zone position moves from the zone 22 toward the zone 12 in case of the outside recording area $A_O$. The recording density of the zone 11 is smaller than that of the zone 12. Since the recording density of the information signal is concerned with a data transfer rate, it will be further described with reference to FIG. 7 showing data transfer rates.

Figure 7:
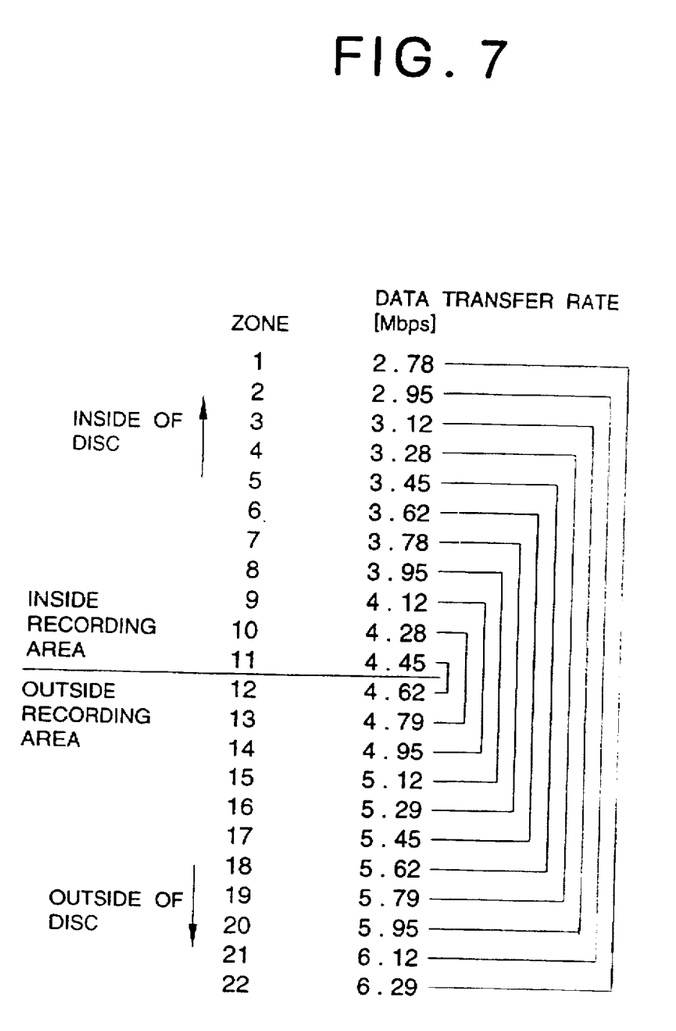
FIG. 7 is a diagram showing a data transfer rate of each zone.

In FIG. 7, the data transfer rates are shown as an example corresponding to the zones 1 to 11 of the inside recording area $A_I$ and the zones 12 to 22 of the outside recording area $A_O$. The recording and reproduction of the information signal are executed in accordance with the step orders in FIG. 6.

In each step, therefore, the sum of the data transfer rate of the zone which is processed by the inside light beam and the data transfer rate of the zone which is processed by the outside light beam is set to a constant value 9.07 [Mbps]. When explaining with respect to step 1, for example, the data transfer rate of the zone 1 is equal to 2.78 [Mbps] and the data transfer rate of the zone 22 is equal to 6.29 [Mbps]. The total data transfer rate of them, therefore, is equal to (2.78+6.29=) 9.07 [Mbps]. A similar result is also derived with respect to other steps 2 to 11.

FIG. 7 shows an example of calculations in case of a size of CD (compact disc). The area is divided into 22 zones and the shortest pit length at the innermost rim in each zone is equal to 0.71 µm. A (1, 7) modulation is used as a modulating system. A rotational speed of the disc is set to 900 r.p.m.

A recording apparatus and a reproducing apparatus for the optical disc as mentioned above will now be described.

Figure 8:
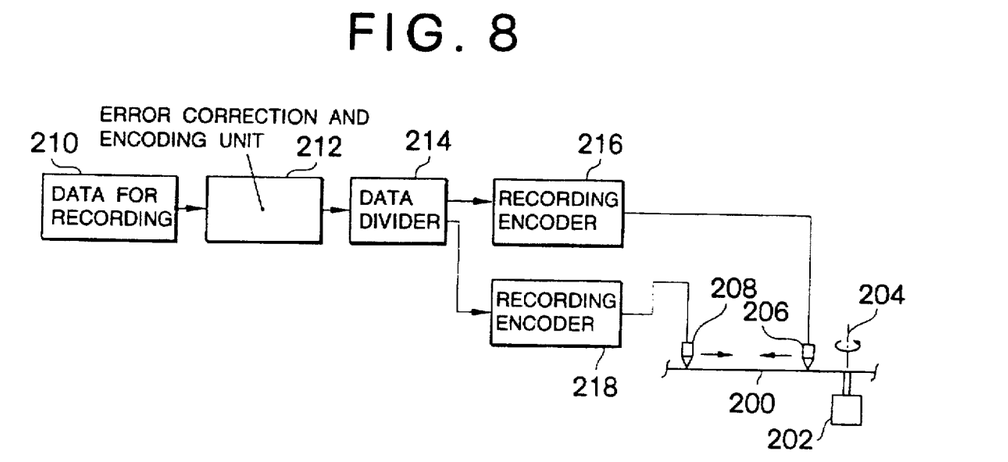
FIG. 8 is a block diagram showing schematically a recording apparatus of the invention.

FIG. 8 schematically shows the recording apparatus. An optical disc 200 is rotated around an axis 204 by a spindle motor 202. Two optical pickups 206 and 208 are individually movably arranged in the disc radial direction above the optical disc 200. When recording, the inside optical pickup 206 moves to the outside in the disc radial direction and the outside optical pickup 208 moves to the inside in the disc radial direction. Information signals are, consequently, recorded along the spiral tracks shown in FIG. 4.

Data 210 for recording as an information signal to be recorded is supplied to a data divider 214 through an error correction and encoder 212. One of the divided data is supplied to the inside optical pickup 206 through a recording encoder 216. The other one of the divided data is supplied to the outside optical pickup 208 through a recording encoder 218. Explanation will now be made hereinbelow with respect to the division of the recording data by the data divider 214 with reference to FIG. 10.

Figure 10:
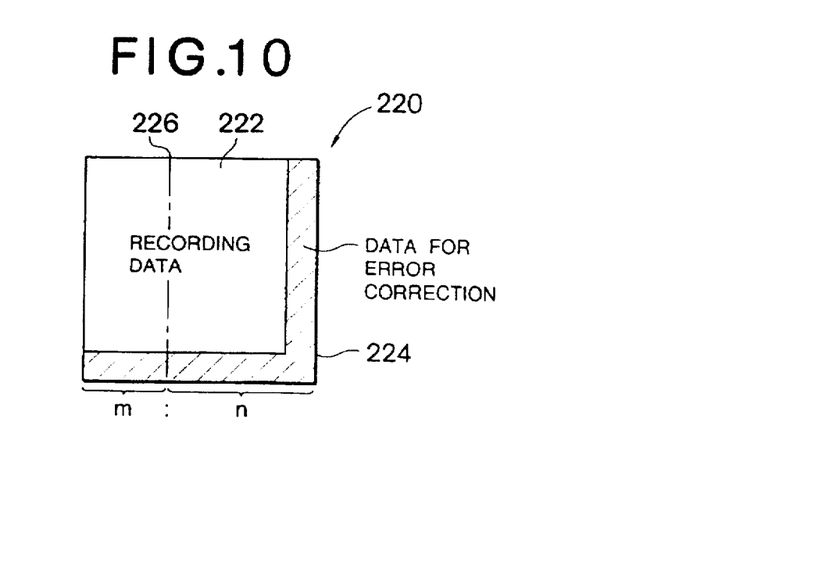
FIG. 10 is a diagram showing a recording ratio of data to the inside and outside zones.

In FIG. 10, data 220 comprises recording data 222 and data 224 for error correction. The data of a ratio (m) in the data 220 is recorded into the inside zone of the optical disc 200. The data of a ratio (n) is recorded into the outside zone of the optical disc 200. An alternate long and short dash line shown by reference numeral 226 denotes a data dividing line to divide the data 220 at a ratio of (m:n). The ratio (m:n) differs in dependence on the step in FIG. 6 and this point will now be described with reference to FIG. 7.

As shown in FIG. 7, as the zone of the inside recording area moves from the zone 1 to the zone 11, the data transfer rate rises, so that the ratio (m) increases. On the other hand, since the data transfer rate decreases as the zone of the outside recording area moves from the zone 22 to the zone 12, the ratio (n) is reduced. In every combination of the inside zone and outside zone, the sum of the ratios (m) and (n) is set to a predetermined value. This point corresponds to that the sum of the data transfer rates is set to a predetermined value 9.07 [Mbps] in any combination of the inside zone and outside zone.

Figure 9:
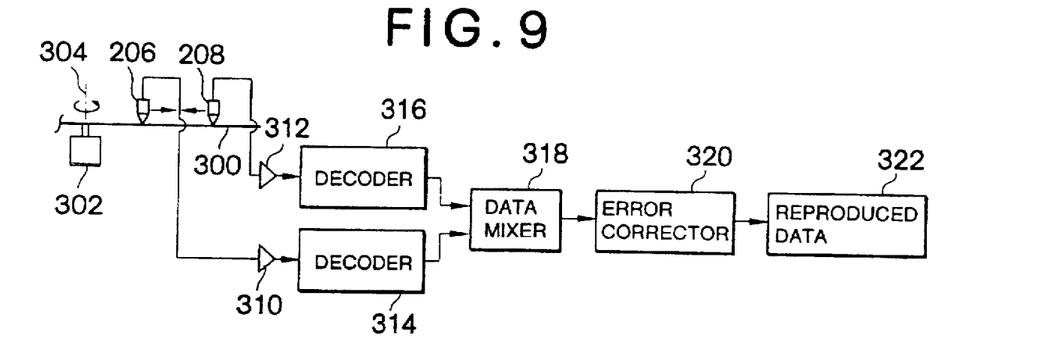
FIG. 9 is a block diagram showing schematically a reproducing apparatus of the invention.

FIG. 9 shows the reproducing apparatus and an optical disc 300 is rotated around an axis 304 by a spindle motor 302. The two optical pickups 206 and 208 are individually movably arranged in the disc radial direction above the optical disc 300. When reproducing, the inside optical pickup 206 moves to the outside in the disc radial direction. The outside optical pickup 208 moves to the inside in the disc radial direction. The information signal, therefore, is reproduced along the spiral tracks shown in FIG. 4.

The signals read out respectively from the disc 300 by the pickups 206 and 208 are supplied to a data mixer 318 through amplifiers 310 and 312 and decoders 314 and 316, respectively. The data mixer 318 mixes the data from the zone of the inside recording area and the data from the zone of the outside recording area, so that the original data 220 in FIG. 10 is derived. A signal from the data mixer 318 is given as reproduced data 322 through an error corrector 320.

Figure 11:
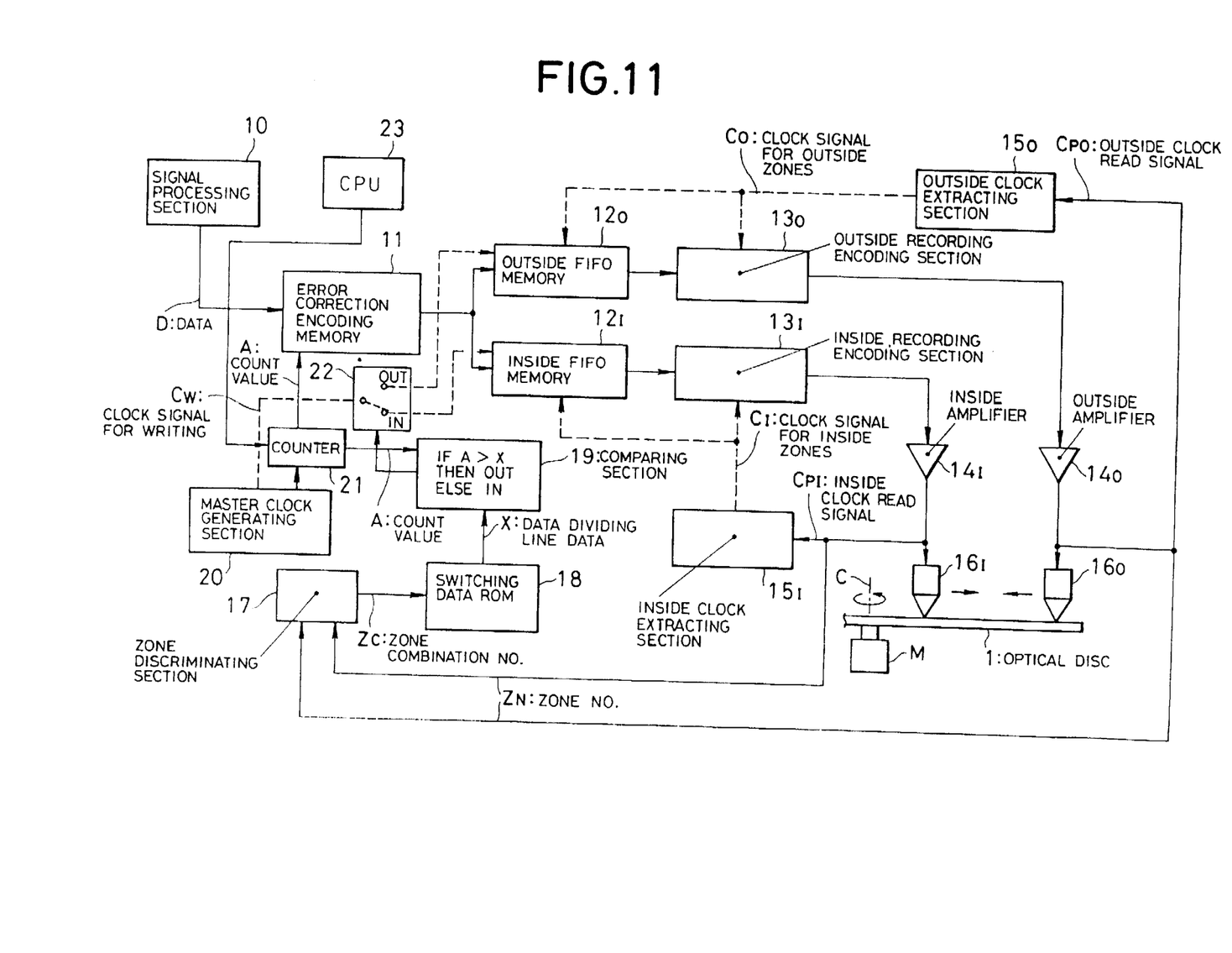
FIG. 11 is a block diagram showing specifically the recording apparatus according to the invention.

FIG. 11 specifically shows a constitution of the recording apparatus. In FIG. 11, data D from a signal processing section 10 is supplied to an inside FIFO memory $12_I$ and an outside FIFO memory $12_O$ through an error correction encoding memory 11. The data from both FIFO memories $12_I$ and $12_O$ is supplied to an inside optical pickup $16_I$ and an outside optical pickup $16_O$ through an inside recording encoding section $13_I$ and an outside recording encoding section $13_O$ and amplifiers $14_I$ and $14_O$, respectively. Both of the optical pickups $16_I$ and $16_O$ record the information signals onto the optical disc 1. The optical disc 1 is rotated around an axis C by a spindle motor M. When recording, the inside optical pickup $16_I$ moves to the outside in the disc radial direction. The outside optical pickup $16_O$ moves to the inside in the disc radial direction. The information signals, therefore, are recorded along the spiral tracks 2 and 3 shown in FIG. 4.

An inside clock read signal $C_{PI}$ and an outside clock read signal $C_{PO}$ which were read out from the disc 1 by the pickups $16_I$ and $16_O$ are supplied to an inside clock extracting section $15_I$ and an outside clock extracting section $15_O$, respectively. A clock signal $C_I$ for the inside zones extracted by the inside clock extracting section $15_I$ is used for synchronization in the inside FIFO memory $12_I$ and inside recording encoding section $13_I$. Similarly, a clock signal $C_O$ for the outside zones extracted by the outside clock extracting section $15_O$ is used for synchronization in the outside FIFO memory $12_O$ and outside recording encoding section $13_O$.

A switch 22 is connected to the FIFO memories $12_I$ and $12_O$. The switch 22 switches a clock signal $C_W$ for writing from a master clock generating section 20 to the IN side or OUT side. The IN side and OUT side of the switch 22 are connected to the inside FIFO memory $12_I$ and outside FIFO memory $12_O$, respectively. When the writing clock signal $C_W$ is supplied to the inside FIFO memory $12_I$ from the IN side of the switch 22, the data D generated from the error correction encoding memory 11 is written into the inside FIFO memory $12_I$. When the writing clock signal $C_W$ is supplied to the outside FIFO memory $12_O$ from the OUT side of the switch 22, the data D generated from the error correction encoding memory 11 is written into the outside FIFO memory $12_O$.

A master clock which is generated from the master clock generating section 20 is supplied to a counter 21. A control signal from a CPU 23 is further supplied to the counter 21. The counter 21 counts the number of master clocks and supplies a count value A to a comparing section 19. The CPU 23 controls each section of the recording apparatus.

The read signals obtained by the pickups $16_I$ and $16_O$ are supplied to a zone discriminating section 17. A zone number $Z_N$ from each read zone of the disc 1 is discriminated by the zone discriminating section 17. A zone combination number $Z_C$ which is generated as a discrimination result from the zone discriminating section 17 is supplied to a switching data ROM 18. The zone combination No. $Z_C$ indicates one zone of the inside recording area $A_I$ and one zone of the outside recording area $A_O$. A combination of those two zones corresponds to each step in FIG. 6. Namely, each zone in the optical disc 1 constructs a zone combination every step in FIG. 6.

The switching data ROM 18 supplies data dividing line data X (refer to reference numeral 226 in FIG. 10) corresponding to the zone combination No. $Z_C$ to the comparing section 19.

The comparing section 19 compares the data dividing line data X from the switching data ROM 18 and the count value A from the counter 21 and controls the switching operation of the switch 22. Namely, when the count value A is equal to or larger than the data dividing line data X (in FIG. 10, region on the right side than the dividing line 226), the switch 22 is switched to the OUT side, thereby allowing the data of the error correction encoding memory 11 to be written into the outside FIFO memory $12_O$. When the count value A is smaller than the data dividing line data X (in FIG. 10, region on the left side than the dividing line 226), the switch 22 is switched to the IN side, thereby allowing the data of the error correction encoding memory 11 to be written into the inside FIFO memory $12_I$.

The operation upon recording will now be described hereinbelow with reference to an operation flowchart of the recording system apparatus of FIG. 12. The operation is accomplished by a control operation by the CPU 23.

In step S1, the pickups $16_I$ and $16_O$ read the signals including the zone No. $Z_N$ from the optical disc 1. In step S2, the zone discriminating section 17 discriminates the zone, thereby checking whether the combination is correct or not. If NO, the optical pickup $16_I$ or $16_O$ is moved to the next zone in step S3 so as to obtain the correct zone combination.

If YES in step S2, the data dividing line data X is read out from the switching data ROM 18 in step S4. In step S5, the error correction encoding (refer to error correction encoding memory 11) for the data D to be recorded is executed. In step S6, the data dividing line data X is compared with the count value A from the counter 21.

When X<A in step S6 (region on the left side than the dividing line 226 in FIG. 10), the writing clock signal $C_W$ is supplied from the master clock generating section 20 to the inside FIFO $12_I$ through the switch 22 in step S7. The data D to be recorded is written into the inside FIFO $12_I$ in step S8. After that, a process in step S9 is executed. When X≧A in step S6 (region on the right side from the dividing line 226 in FIG. 10), on the contrary, the writing clock signal $C_W$ is supplied from the master clock generating section 20 to the outside FIFO $12_O$ through the switch 22 in step S10. The data D to be recorded is written into the outside FIFO $12_O$ in step S11. After that, the process in step S9 is executed.

In step S9, the clock signal $C_I$ for the inside zones and the clock signal $C_O$ for the outside zones are extracted from the read signals of the pickups $16_I$ and $16_O$. In step S12, the data D is read out from the inside FIFO $12_I$ on the basis of the clock signal $C_I$ for the inside zones and the data D is read out from the outside FIFO $12_O$ on the basis of the clock signal $C_O$ for the outside zones. In step S13, the data D read out on the basis of the clock signal $C_I$ for the inside zones is recording-encoded by the inside recording encoding section $13_I$ and the data D read out on the basis of the clock signal $C_O$ for the outside zones is recording-encoded by the outside recording encoding section $13_O$. In step S14, the recording to the relevant zone in the inside recording area $A_I$ of the optical disc 1 is executed by the optical pickup $16_I$ and the recording to the relevant zone in the outside recording area $A_O$ of the optical disc 1 is performed by the optical pickup $16_O$. After completion of the execution of step S14, step S1 is again executed and the above operations are repeated.

Figure 12:
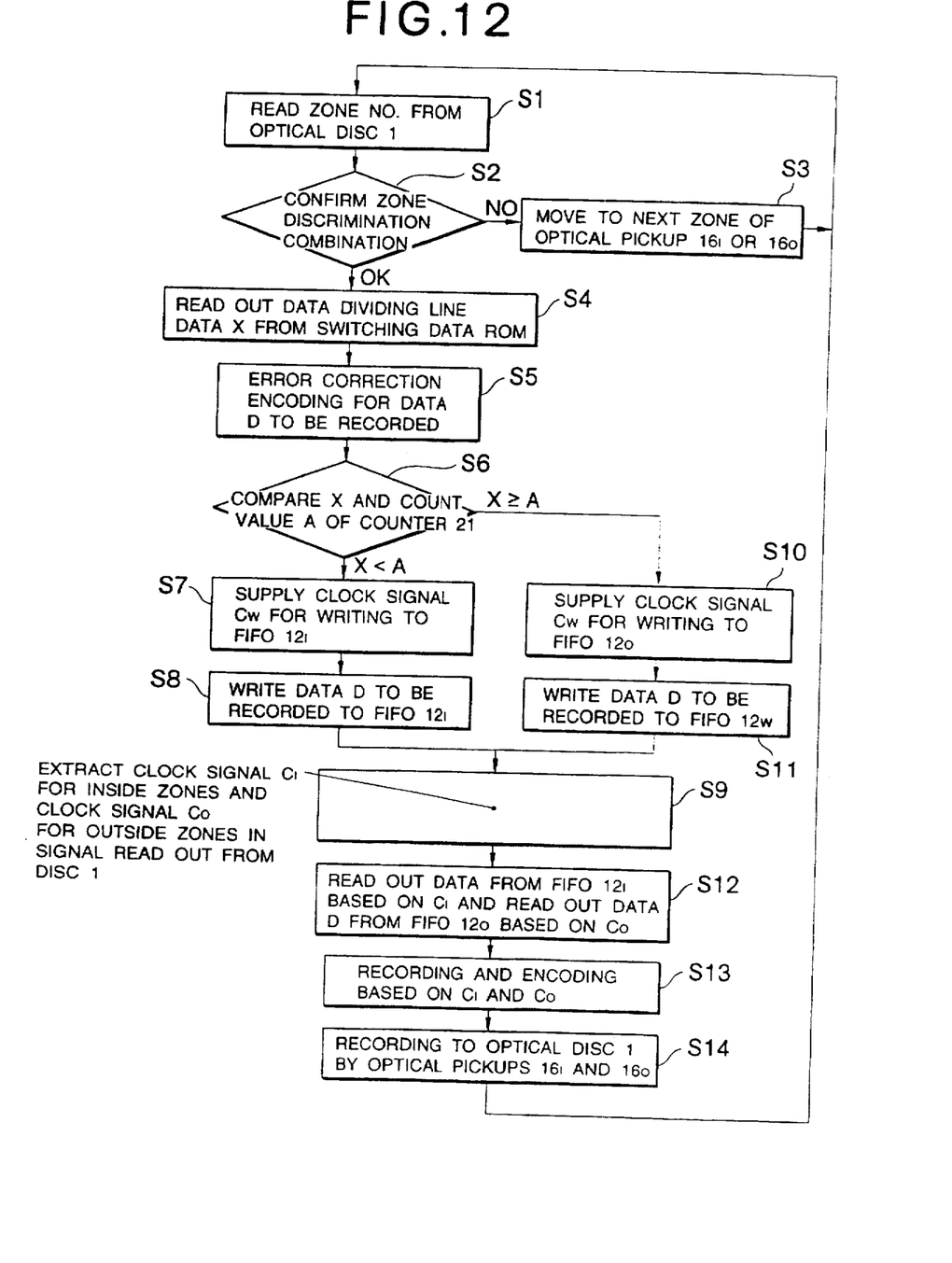
FIG. 12 is a flowchart showing the operation of the recording apparatus of FIG. 11.

In FIGS. 11 and 12, the data D from the error correction encoding memory 11 is supplied to either one of the inside FIFO $12_I$ and the outside FIFO $12_O$ by the switching operation of the switch 22. Since both of the FIFOs $12_I$ and $12_O$, however, always generate the data synchronously with the clock signals $C_I$ and $C_O$, the data is simultaneously recorded in the inside and outside recording areas $A_I$ and $A_O$ of the disc 1.

Figure 13:
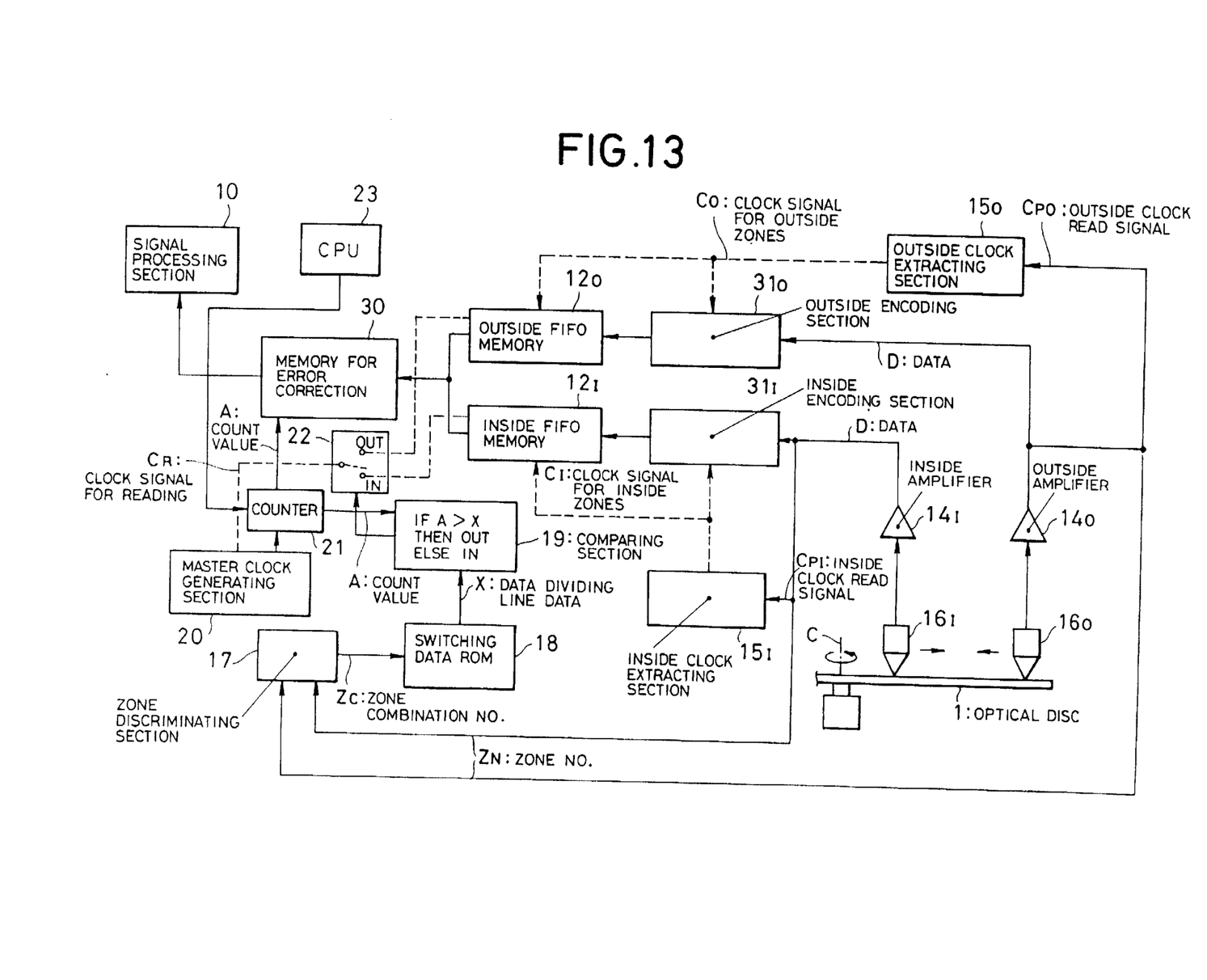
FIG. 13 is a block diagram showing specifically the reproducing apparatus according to the invention.

FIG. 13 specifically shows a construction of the reproducing apparatus.

In FIG. 13, the optical disc 1 is rotated around the axis C by the spindle motor M. When reproducing, the inside optical pickup $16_I$ moves to the outside in the disc radial direction. The outside optical pickup $16_O$ is moved to the inside in the disc radial direction. The information signals, consequently, are reproduced along the spiral tracks 2 and 3 shown in FIG. 4.

The signals read out from the optical pickups $16_I$ and $16_O$ are supplied to the amplifiers $14_I$ and $14_O$. The data D from the amplifiers $14_I$ and $14_O$ is supplied to the inside FIFO memory $12_I$ and outside FIFO memory $12_O$ through an inside decoding section $31_I$ and an outside decoding section $31_O$, respectively. The data from both of the FIFO memories $12_I$ and $12_O$ is mixed. The mixed data is supplied to a memory 30 for error correction and is supplied to the signal processing section 10.

The inside clock read signal $C_{PI}$ and outside clock read signal $C_{PO}$ in the read signals from the disc 1 are supplied to the inside clock extracting section $15_I$ and outside clock extracting section $15_O$, respectively. The clock signal $C_I$ for the inside zones extracted by the inside clock extracting section $15_I$ is used for synchronization in the inside FIFO memory $12_I$ and inside decoding section $31_I$. Similarly, the clock signal $C_O$ for the outside zones extracted by the outside clock extracting section $15_O$ is used for synchronization in the outside FIFO memory $12_O$ and outside decoding section $31_O$.

The switch 22 switches the clock signal $C_R$ for reading from the master clock generating section 20 to the IN side or OUT side. The IN side and OUT side of the switch 22 are connected to the inside FIFO memory $12_I$ and outside FIFO memory $12_O$, respectively. When the reading clock signal $C_R$ is supplied from the IN side of the switch 22 to the inside FIFO memory $12_I$ by the switching operation of the switch 22, the data from the inside FIFO memory $12_I$ is read out and written into the memory 30 for error correction. When the reading clock signal $C_R$ is supplied from the OUT side of the switch 22 to the outside FIFO memory $12_O$, the data from the outside FIFO memory $12_O$ is read out and written into the error correction memory 30.

The master clock which is generated from the master clock generating section 20 is supplied to the counter 21. The control signal from the CPU 23 is further supplied to the counter 21. The counter 21 counts the number of master clocks and supplies the count value A to the comparing section 19. The CPU 23 controls each section of the reproducing apparatus although a control line is not shown.

The read signals by the pickups $16_I$ and $16_O$ are supplied to the zone discriminating section 17. The zone No. $Z_N$ from each reading zone of the disc 1 is discriminated in the zone discriminating section 17. The zone combination No. $Z_C$ which is generated as a discrimination result from the zone discriminating section 17 is supplied to the switching data ROM 18. The data dividing line data X (refer to 226 in FIG. 10) corresponding to the zone combination No. $Z_C$ is supplied from the switching data ROM 18 to the comparing section 19.

The comparing section 19 compares the data dividing line X from the switching data ROM 18 and the count value A from the counter 21, thereby controlling the switching operation of the switch 22. Namely, when the count value A is equal to or larger than the data dividing line data X (region on the right side from the dividing line 226 in FIG. 10), the switch 22 is switched to the OUT side, thereby allowing the data to be read out from the outside FIFO $12_O$ and to be written into the error correction memory 30. When the count value A is smaller than the data dividing line data X (region on the left side than the dividing line 226 in FIG. 10), the switch 22 is switched to the IN side, thereby allowing the data to be read out from the inside FIFO $12_I$ and to be written into the error correction memory 30.

The operation upon reproducing will now be described with reference to an operation flowchart of the reproducing apparatus of FIG. 14. The operation is accomplished by a control operation by the CPU 23.

In step S1, the pickups $16_I$ and $16_O$ read the signals including the zone No. $Z_N$ from the optical disc 1. The zone discriminating section 17 discriminates the zone and checks to see if the combination is correct or not in step S2. If NO, the optical pickups $16_I$ or $16_O$ is moved to the next zone in step S3 so as to obtain a correct combination.

If YES in step S2, the clock signals $C_I$ and $C_O$ in the read signals from the optical disc 1 are extracted by the clock extracting sections $15_I$ and $15_O$ in step S20. In step S21, the data D is read on the basis of the clock signals $C_I$ and $C_O$ from the optical disc 1. In step S22, the data D is decoded (in the decoding sections $31_I$ and $31_O$) on the basis of the clock signals $C_I$ and $C_O$. In step S23, the data D from the decoding sections $31_I$ and $31_O$ is written into the inside FIFO $12_I$, and outside FIFO $12_O$ on the basis of the clock signals $C_I$ and $C_O$ in step S23. In step S24, the data dividing line data X is read out from the switching data ROM 18. In step S25, the comparing section 19 compares the data dividing line data X and the count value A from the counter 21.

In step S25, when X<A (region on the left side than the dividing line 226 in FIG. 10), the reading clock signal $C_R$ is supplied from the master clock generating section 20 to the inside FIFO $12_I$ through the switch 22 in step S26. In step S27, the data D is read out from the inside FIFO $12_I$ on the basis of the reading clock signal $C_R$ and is written into the error correction memory 30. After that, a process in step S28 is executed. When X≧A in step S25 (region on the right side from the dividing line 226 in FIG. 10), the reading clock signal $C_R$ is supplied from the master clock generating section 20 to the outside FIFO $12_O$ through the switch 22 in step S29. In step S30, the data D is read out from the outside FIFO $12_O$ on the basis of the reading clock signal $C_R$ and written into the error correction memory 30. After that, step S28 is executed.

In step S28, the error correction and error extraction are executed in the error correction memory 30 for the data D. After completion of the execution of step S28, step S1 is again executed and the above operations are repeated.

Figure 14:
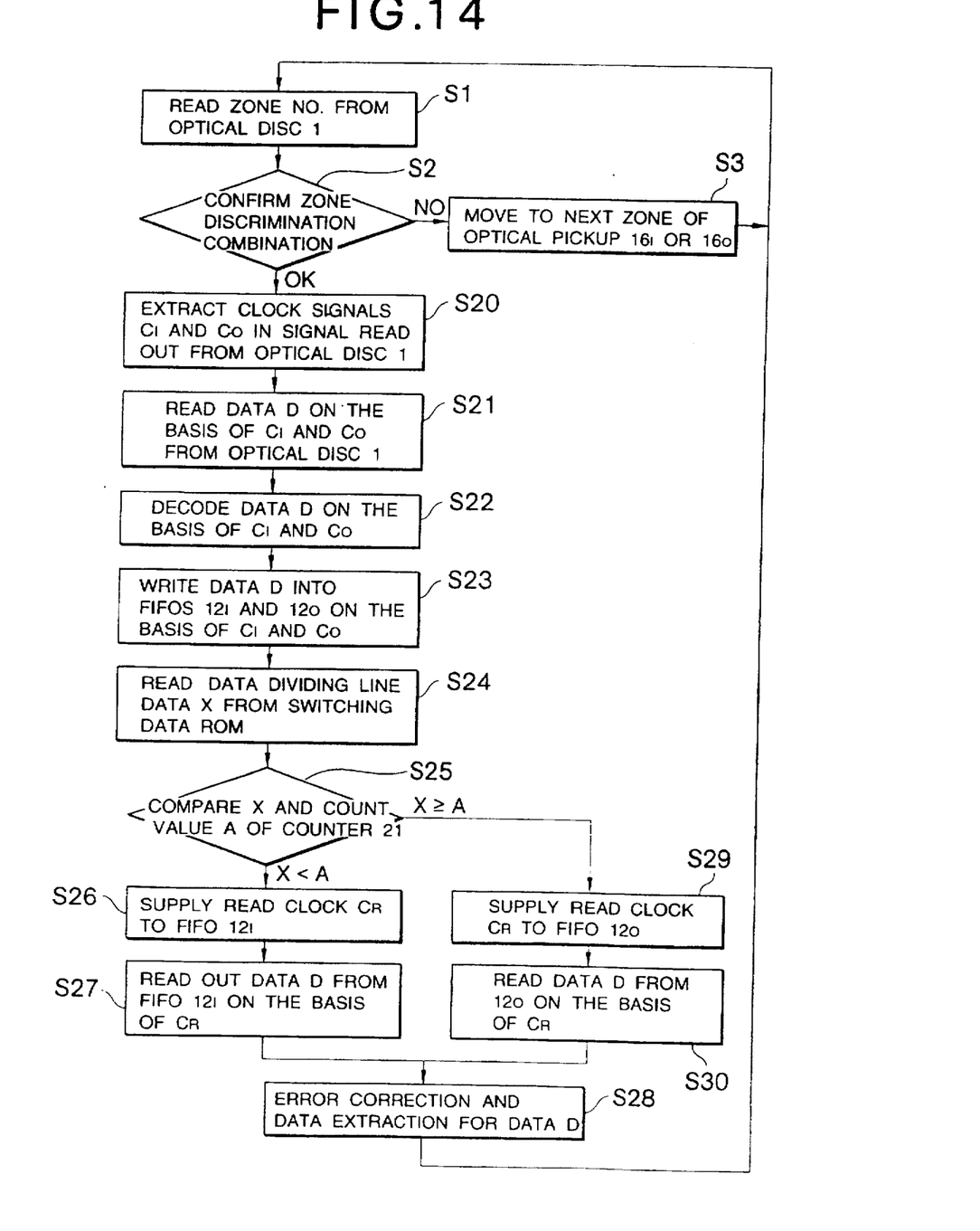
FIG. 14 is a flowchart showing the operation of the reproducing apparatus of FIG. 13.

In FIGS. 13 and 14, the data of the disc inside recording area $A_I$ and the data of the disc outside recording area $A_O$ are always simultaneously read out from the inside recording area $A_I$ and outside recording area $A_O$ of the disc 1 synchronously with the clock signals $C_I$ and $C_O$ and are written into the inside FIFO $12_I$ and outside FIFO $12_O$, respectively. By the switching operation of the switch 22, either one of the data of the disc inside recording area $A_I$ of the inside FIFO $12_I$ and the data of the disc outside recording area $A_O$ of the outside FIFO $12_O$ is written into the error correction memory 30.

In the recording apparatus and reproducing apparatus shown in FIGS. 11 and 13, the portions shown by the same reference numerals are the portions which can be commonly used in case of integrally constructing those apparatuses as a single recording and reproducing apparatus.

In the flowchart of FIG. 12, when the information signal to be recorded doesn't exist, the recording operation is finished without returning to step S1. Similarly, in the flowchart of FIG. 14, when the information signal to be reproduced doesn't exist, the reproducing operation is finished without returning to step S1.

According to the invention as described above, as compared with the conventional optical recording medium, the recording density can be improved and the higher predetermined data transfer rate can be obtained. For example, the recording density is increased by about 4/3 times and the data transfer rate is raised to a predetermined value that is larger by about 5/4 times.

What is claimed is:

1. A recording apparatus for recording an information signal to an optical recording medium which is constructed in a manner such that a plurality of recording areas in which an information signal is recorded along spiral tracks are arranged in a ring shape on a recording surface and a vortex direction of the spiral track of the outside recording area among said plurality of recording areas differs from that of the spiral track of the inside recording area, comprising:

a first writing device which is movably arranged for said outside recording area and writes the information signal into said outside recording area; and a second writing device which is movably arranged for said inside recording area and writes the information signal into said inside recording area, wherein in a recording mode, said first writing device executes the writing operation from the outer rim side toward the inner rim side of the spiral track of said outside recording area and said second writing device executes the writing operation from the inner rim side toward the outer rim side of the spiral track of said outside recording area.

2. A recording apparatus for recording an information signal to an optical recording medium which is constructed in a manner such that a plurality of recording areas in each of which the information signal is recorded along spiral tracks are arranged in ring shapes on a recording surface and a vortex direction of the spiral track of an outside recording area among said plurality of recording areas differs from a vortex direction of the spiral track of an inside recording area, comprising:

a first writing device which is movably arranged for said outside recording area and writes the information signal into said outside recording area; and a second writing device which is movably arranged for said inside recording area and writes the information signal into said inside recording area, wherein in a recording mode, said first writing device executes the writing operation from the outer rim side toward the inner rim side of the spiral track of said outside recording area and said second writing device executes the writing operation from the inner rim side toward the outer rim side of the spiral track of said inside recording area.

3. A recording apparatus according to claim 2, further comprising dividing means for dividing the information signal to be recorded into two information components, for supplying one of the two information components to said first writing device and for supplying the other of the two information components to said second writing device.

4. A recording apparatus according to claim 2, wherein as a writing position by said first writing device moves from the outer rim side toward the inner rim side of the spiral track of said outside recording area, a first transfer rate of the information signal supplied to said first writing device decreases, and as a writing position by said second writing device moves from the inner rim side toward the outer rim side of the spiral track of said inside recording area, a second transfer rate of the information signal supplied to said second writing device increases.

5. A recording apparatus according to claim 4, wherein the sum of the first and second transfer rates is constant.

6. A reproducing apparatus for reading and reproducing an information signal from an optical recording medium which is constructed in a manner such that a plurality of recording areas in each of which the information signal has been recorded along spiral tracks are arranged in ring shapes on a recording surface and a vortex direction of the spiral track of an outside recording area among said plurality of recording areas differs from a vortex direction of the spiral track of an inside recording area, comprising:

a first reading device which is movably arranged for said outside recording area and reads the information signal from said outside recording area; and a second reading device which is movably arranged for said inside recording area and reads the information signal from said inside recording area, wherein upon reproducing, said first reading device executes the reading operation from the outer rim side toward the inner rim side of the spiral track of said outside recording area and said second reading device executes the reading operation from the inner rim side toward the outer rim side of the spiral track of said inside recording area.

7. A reproducing apparatus according to claim 6, further comprising mixing means for mixing the information signals read by said first and second reading devices.

* * * * *